United States Patent
Fleming

(10) Patent No.: US 7,877,703 B1
(45) Date of Patent: Jan. 25, 2011

(54) INTELLIGENT RENDERING OF INFORMATION IN A LIMITED DISPLAY ENVIRONMENT

(75) Inventor: Michael Fleming, San Leandro, CA (US)

(73) Assignee: Seven Networks, Inc., Redwood City, CA (US)

(*) Notice: Subject to any disclaimer, the term of this patent is extended or adjusted under 35 U.S.C. 154(b) by 740 days.

(21) Appl. No.: 11/227,013

(22) Filed: Sep. 14, 2005

Related U.S. Application Data

(60) Provisional application No. 60/661,757, filed on Mar. 14, 2005.

(51) Int. Cl.
*G06F 3/048* (2006.01)
(52) U.S. Cl. .................. 715/800; 715/788; 715/801
(58) Field of Classification Search .............. 715/765, 715/856, 779, 767, 788, 794, 800, 801
See application file for complete search history.

(56) References Cited

U.S. PATENT DOCUMENTS

| | | | |
|---|---|---|---|
| 5,384,892 A | 1/1995 | Strong | |
| 5,729,704 A | 3/1998 | Stone et al. | |
| 5,758,322 A | 5/1998 | Rongley | |
| 5,867,817 A | 2/1999 | Catallo et al. | |
| 5,960,394 A | 9/1999 | Gould et al. | |
| 6,057,855 A | 5/2000 | Barkans | |
| 6,300,947 B1* | 10/2001 | Kanevsky | 715/866 |
| 6,397,230 B1 | 5/2002 | Carmel | |
| 6,593,944 B1* | 7/2003 | Nicolas et al. | 715/744 |
| 6,727,917 B1 | 4/2004 | Chew et al. | |
| 6,741,232 B1 | 5/2004 | Siedlikowski et al. | |
| 6,771,294 B1 | 8/2004 | Pulli et al. | |
| 6,775,362 B1 | 8/2004 | Ransom | |
| 6,867,774 B1 | 3/2005 | Halmshaw | |
| 6,957,397 B1* | 10/2005 | Hawkins et al. | 715/856 |
| 7,234,111 B2 | 6/2007 | Chu | |
| 7,259,666 B1 | 8/2007 | Hermsmeyer | |
| 7,392,483 B2 | 6/2008 | Wong | |
| 7,483,036 B2 | 1/2009 | Moore | |
| 2002/0089542 A1 | 7/2002 | Imamura | |
| 2002/0158908 A1* | 10/2002 | Vaajala et al. | 345/767 |
| 2003/0063120 A1 | 4/2003 | Wong et al. | |

(Continued)

OTHER PUBLICATIONS

Myers, Brad A. et al., "Extending the Windows Desktop Interface with Connected Handheld Computers," USENIX Windows Systems Symposium, Seattle, Washington, Aug. 3-4, 2000.

(Continued)

*Primary Examiner*—Weilun Lo
*Assistant Examiner*—Truc T Chuong
(74) *Attorney, Agent, or Firm*—Townsend and Townsend and Crew LLP

(57) ABSTRACT

Methods for the intelligent rendering of information in a limited display environment are provided. Display environments, especially in mobile devices, are limited with regard to physical space and technical capability. The present invention provides for the scaling of information in the display in light of those limitations. Additional methods for intelligently determining information to be or not to be displayed in the environment are further provided. Determinations of information to be displayed may be a result of a user-determination or automatic determinations made by a user device. Zooming and 'quick look' features are also provided.

8 Claims, 11 Drawing Sheets

U.S. PATENT DOCUMENTS

| | | | |
|---|---|---|---|
| 2003/0070061 | A1 | 4/2003 | Wong |
| 2003/0117432 | A1 | 6/2003 | Kautto-Kiovula et al. |
| 2003/0156146 | A1 | 8/2003 | Suomela et al. |
| 2003/0169262 | A1 | 9/2003 | Lavelle et al. |
| 2004/0027326 | A1 | 2/2004 | Hays et al. |
| 2004/0027375 | A1 | 2/2004 | Ellis et al. |
| 2004/0027378 | A1 | 2/2004 | Hays et al. |
| 2004/0043770 | A1 | 3/2004 | Amit |
| 2004/0051715 | A1 | 3/2004 | Brokenshire |
| 2004/0068698 | A1 | 4/2004 | Wu et al. |
| 2004/0075695 | A1 | 4/2004 | Chew et al. |
| 2004/0141011 | A1 | 7/2004 | Smethers et al. |
| 2004/0189610 | A1 | 9/2004 | Friend |
| 2004/0266364 | A1 | 12/2004 | Nguyen et al. |
| 2005/0122333 | A1 | 6/2005 | Sumanaweera |
| 2005/0155027 | A1 | 7/2005 | Wei |
| 2005/0235214 | A1* | 10/2005 | Shimizu et al. ............. 715/864 |
| 2005/0278647 | A1* | 12/2005 | Leavitt et al. ............... 715/765 |
| 2006/0132495 | A1 | 6/2006 | Anderson |
| 2006/0242607 | A1* | 10/2006 | Hudson ...................... 715/863 |
| 2008/0313282 | A1 | 12/2008 | Warila |

OTHER PUBLICATIONS

Myers, Brad A. et al., "User Interfaces that Span Hand-Held and Fixed Devices," Proposal to Attend CHI 2000 Workshop on Distributed and Disappearing User Interfaces in Ubiquitous Computing.

Ringel, Meredith et al., "iStuff: A Scalable Architecture for Lightweight, Wireless Devices for Ubicomp User Interfaces," 2002.

B'Far, Reza et al., "Designing Effective User Interfaces for Wireless Devices," Publication Date Unknown, Last Accessed Feb. 2005.

Bergman, Lawrence D. et al., "Programming-by-Demonstration for Behavior-Based User Interface Customization," Workshop on Behavior-Based User Interface Customization 2004.

Signorini, Eugene, "SEVEN's Service-Based Wireless Solutions Enable Enterprises to Untether E-Mail," Yankee Group, Oct. 2004.

Ortiz, C. Enrique, "An Introduction to the Symbian OS Platform for PalmOS Developers," MetroWerks, 2002.

Koeppel, Dan, "GUIs Just Want to Have Fun," Wired Magazine Issue 8.10, Oct. 2000.

Mason, Luke, "Windows XP: New GUI Design Shows Skin is In," Tech Republic, Apr. 4, 2001.

Nokia, "Developer Platforms," Publication Date Unknown, Last Accessed Feb. 2005.

Hardy, Ed, "Microsoft Proposed Two New Thumb-Driven User Interfaces," Brighthand, Apr. 16, 2005.

Karlson, Amy K. et al, "AppLens and LaunchTile: Two Designs for One-Handed Thumb Use on Small Devices," CHI 2005, Portland, Oregon, Apr. 2-7, 2005.

* cited by examiner

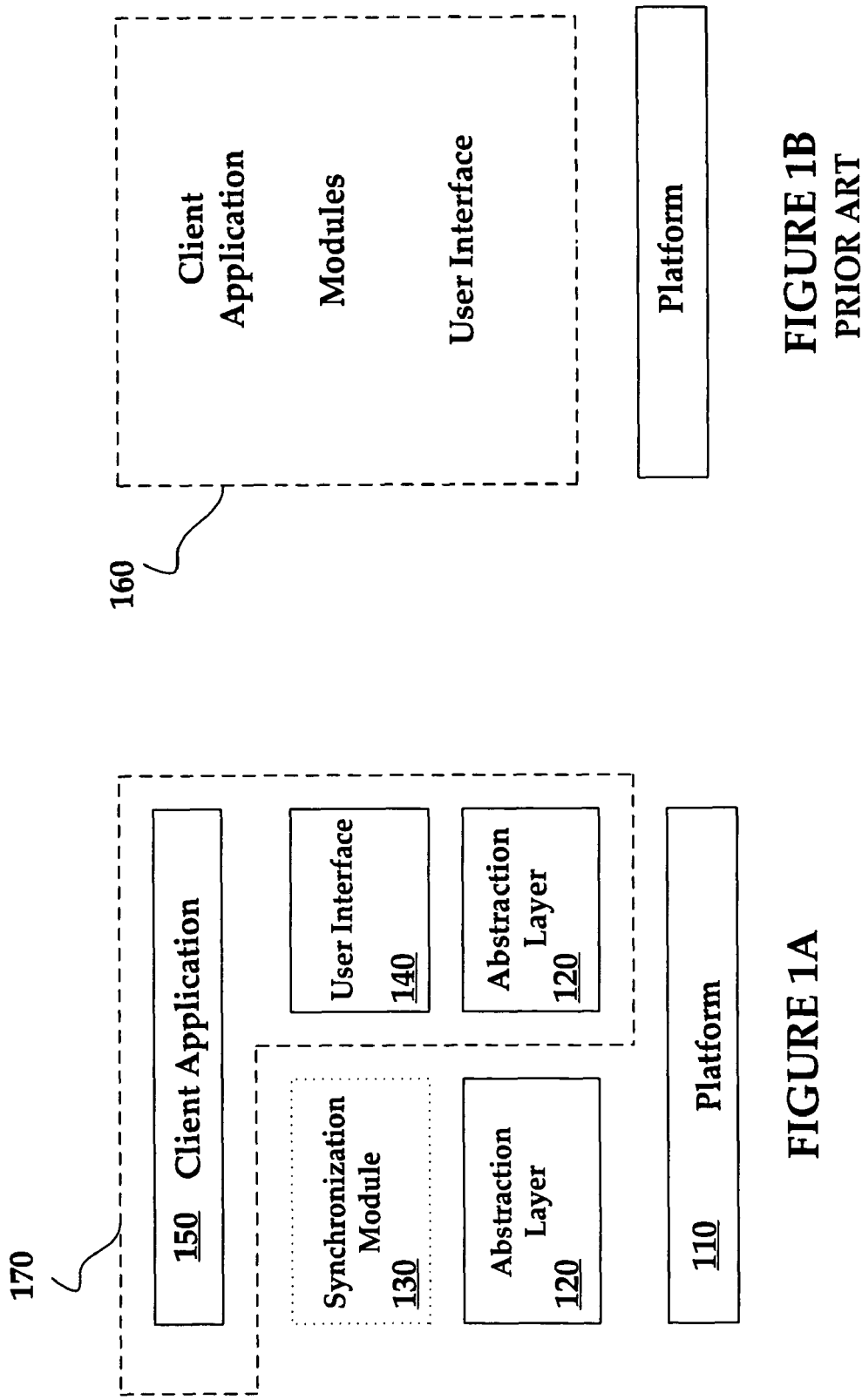

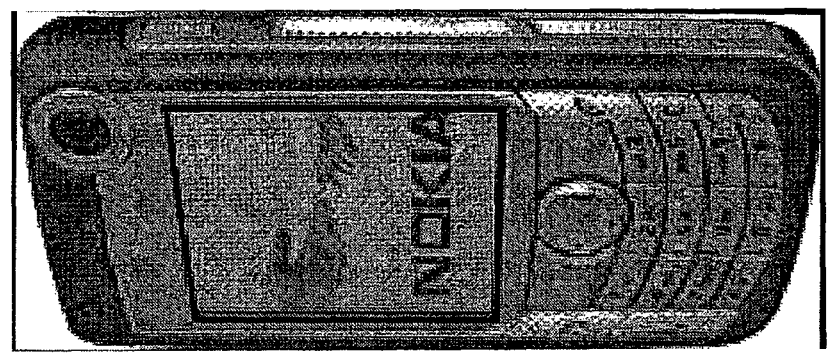
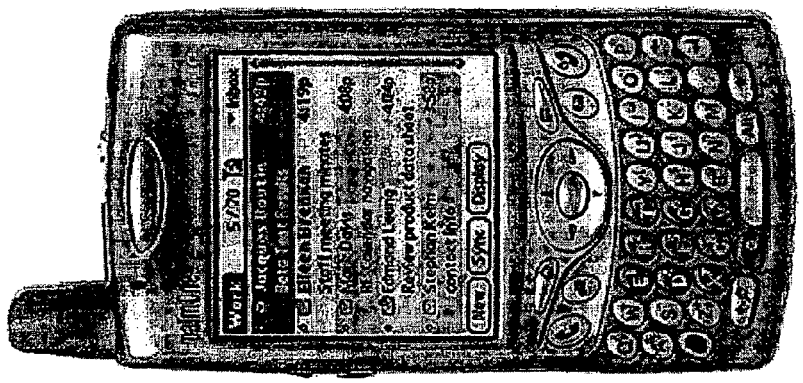
FIGURE 4A
PRIOR ART

FIGURE 5D

INTELLIGENT RENDERING OF INFORMATION IN A LIMITED DISPLAY ENVIRONMENT

CROSS-REFERENCE TO RELATED APPLICATIONS

This application claims the priority benefit of U.S. provisional patent application No. 60/661,757 filed Mar. 14, 2005 and entitled "Agnostic User Interface for Use in Mobile Devices." The disclosure of this application is incorporated herein by reference. This application is also related to U.S. patent application Ser. No. 11/123,540 filed May 5, 2005 and entitled "Universal Text-Entry"; U.S. patent application Ser. No. 11/227,323 filed Sep. 14, 2005 and entitled "Cross Platform Event Engine"; and U.S. patent application Ser. No. 11/227,272 filed Sep. 14, 2005 and entitled "Platform Neutral User Interface for Mobile Devices." The disclosure of each of the aforementioned applications is incorporated herein by reference. All the aforementioned applications are commonly owned and assigned.

BACKGROUND OF THE INVENTION

1. Field of the Invention

The present invention relates generally to the field of user interfaces. More specifically, the present invention relates to the intelligent rendering of information in a limited display environment by user interfaces, those interfaces operating across various platforms in various mobile devices.

2. Description of the Related Art

Mobile data access devices make it simple and affordable to access corporate and personal data while out of the office. Software allowing for such access is becoming a standard feature on a variety of mobile devices and platforms: BREW, Pocket PCs, Smartphones, Symbian-based phones, PDAs and Internet browsers.

There are approximately 35 million workers that make up the 'mobile workforce,' that is, individuals who carry out all or substantial portions of their job away from a physical office setting. With the increasing number of on-the-go workers, electronic mail continues to be, arguably, the most important business application. As a result, this workforce—as well as the casual individual user—has an inherent need for mobile access to their electronic mail and other data.

Despite an ever-increasing need for access to electronic mail and data, costs of ownership for mobile data access remain a barrier. The issue is no longer whether mobile data access is a necessity but whether it can be deployed and managed in an effective manner.

While cost is an obvious concern in equipping the workforce with the means for accessing data on-the-go, the implementation, development, integration and management of mobile data access solutions are of paramount interest. Despite mobile devices becoming a staple in personal and commercial enterprise, rapidly evolving changes such as number portability, mergers in the telecommunications and software industry and the lack of any one particular technical standard in the mobile device technological space, make providing support for a wide-array of mobile devices an important, albeit difficult, issue with regard to accessing data from a mobile device. The lack of internal expertise, the immaturity of standards, the complexity of integration, device limitations and application development have all been explicitly recognized as barriers to adopting mobile devices for providing access to data while, for example, out of the office or away from a personal desktop computer.

Increased user-flexibility—user familiarity amongst a variety of different devices and/or platforms—may be provided by device-neutral software as is described in the present application. For example, a single application (e.g., a notepad or an e-mail application) could be run on various mobile devices. The user-flexibility proffered by device-neutral software helps to improve IT-familiarity and expertise in that IT personnel need only becomes familiar with one software application (or suite of applications) instead of a particularized application for each individual platform environment and/or mobile device. Such device and platform neutrality increases end-user adoption of mobile device technologies in their fullest sense thereby better ensuring a return on investment.

But as adoption and pervasiveness of mobile devices and operating platforms increase, so does technological fragmentation within the marketplace. That is, with the increasing availability of differing mobile devices and operating platforms, there is an increase in disjunct technologies and methodologies that evidence an increasing need for standardization. Until there exists an overarching technological standard adopted by or at least a significant portion of the marketplace, developing device- and/or platform-neutral applications, as are taught in the present application, for mobile devices makes application development and testing less of a colossal task for software engineers while ensuring higher quality and better overall design.

Device-neutral user interfaces, like those described in the present application, will play a critical role in mobile device development. Such interfaces must not only provide access to mission critical data but also deal with the realities of variations in screen size, pixel density, aspect ratio and screen use availability amongst devices; limited memory on a mobile device; limited processing power; general quirkiness between platforms; and, perhaps most noticeable to the end-user, the general lack of space for interacting with the mobile device (e.g., keyboard space for text-entry and display space for viewing data). A keyboard, mouse or even a stylus are normally not available for such interaction in a traditional wireless or mobile device. Not only is input difficult, so is viewing a display rendering information. This is especially true when the mobile device happens to also be a cellular telephone.

Engineers have previously been forced to deal with the fact that present-day prior art interfaces are not be suitable for more than one primary set of devices. For example, PDAs utilize a stylus and touch-screen whereas cellular phones may utilize a keypad and/or five-way navigation. If an engineer is satisfied with limiting an interface to a particular type of environment (e.g., platform or device), the engineer must still deal with the nuances of particular device manufacturers (e.g., a Palm PDA versus a Nokia cell phone) and, in some instances, particular device models (e.g., PALM VIIx and Nokia 7110).

Even if an engineer is satisfied with limiting an interface to a particular device, the engineer must still deal with the nuances of particular device manufacturers (e.g., a Palm PDA versus a Nokia cell phone) and, in some instances, particular device models (e.g., PALM VIIx and Nokia 7110).

An engineer is still, in many instances, limited by the fact that he or she must pre-generate static interfaces or multiple permutations of the interface as they pertain to a particular device or platform family. This results in delays for delivery of applications and increased costs in research and development, which inevitably result in increased costs for the end-user.

There is, therefore, a need in the art for a user interface that is neutral with regard to operating platform and device wherein one client interface will work on multiple platforms and devices.

There is a further need in the art for a user interface that will intelligently adjust to hardware and software limitations of a particular device or platform so that information displayed on the user interface will maintain a consistent appearance amongst devices notwithstanding the specific limitations of a particular device or platform.

There is a further need in the art for a user interface that will intelligently adjust to hardware or software limitations of a particular device or platform so that unnecessary or non-critical information may be removed from display on the user interface to allow for the display of necessary or critical information.

It should be noted, in the course of this disclosure, that while a device (e.g., hardware) and platform (e.g., software) are recognized as distinct—albeit related—entities, any reference to a device or a platform should be considered inclusive of both. Similarly, any reference to the neutrality of an interface, in general, should be interpreted as neutrality as to both a device and a platform.

Further, it should be noted that any disclosed device or platform-neutral user interface is not dependent on the presentation or transmission of communications data (e.g., electronic mail, calendar, SMS) or utilization of user data (e.g., data stored on a desktop).

SUMMARY OF THE INVENTION

The present invention advantageously provides a virtual platform neutral to physical device or software/hardware operating platform. The virtual platform comprises an abstraction layer that allows for portability across a variety of mobile devices and operating platforms, especially with regard to user interfaces. The virtual platform and abstraction layer and any related software allow for a user interface on a first device to appear and operate substantially similar to a user interface on a second device regardless of differences or limitations that may exist between the operating systems or physical nuances of the two devices. By providing a device-neutral user interface application, a user can move effortlessly between devices should, for example, the need for replacement or repair of a particular device arise or if the user possess multiple mobile devices (e.g., one device for personal use and a second device for work use).

Additionally, the neutrality of the interface application makes it possible for software developers and engineers to utilize one test suite for a variety of devices or platforms when introducing new features thereby reducing lag-time in delivering applications to market as well as research and development costs. For example, instead of developing five different interfaces for five different devices, one interface may be utilized across five different devices. These reductions in the time and cost of development and delivery inevitably translate into savings for the end-user and/or increases in profit and competitiveness for the application and/or device developer/manufacturer.

The present invention also provides for preventing distorted images in a user interface caused by pixel variances amongst devices. Relative, dynamic and 'as needed' adjustments in the layout of a user interface are also disclosed as is global scaling of information in a user interface.

The present invention provides for generating a 'quick look' of information in a user interface in addition to intelligent prioritization of menu commands and display icons as well as the management of information utilizing five-way navigation.

BRIEF DESCRIPTION OF THE DRAWINGS

FIG. 1A illustrates an exemplary embodiment of a device platform comprising various operational layers and modules for interaction with a particular device client and as described in the present invention.

FIG. 1B illustrates a device platform comprising various operational layers and modules for interaction with a particular device client as may be found in the prior art.

FIG. 4A illustrates the differences in screen display ratio for two different mobile devices as found in the prior art.

FIG. 5D illustrates an exemplary dynamic adjustment as it pertains to a 'quick-look' or 'short attention span' feature in a device-neutral user interface.

DETAILED DESCRIPTION OF AN EXEMPLARY EMBODIMENT

Figure 2A:
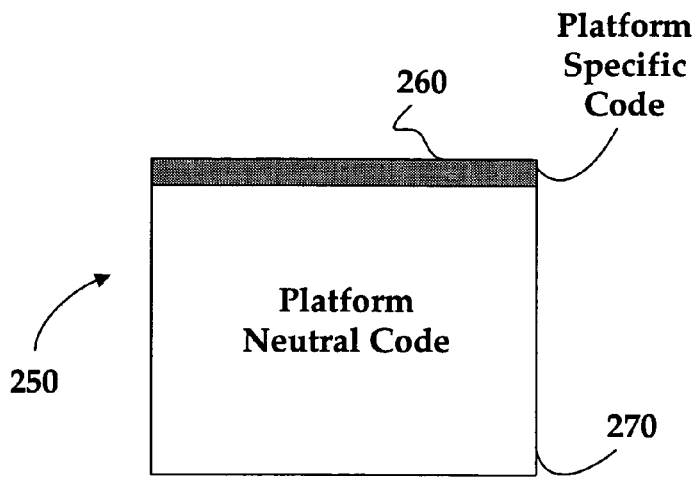
FIG. 2A illustrates an exemplary embodiment of an abstraction layer and a balance of platform-specific code and platform-neutral code as may be found in a device- and/or platform-neutral interface such as that described in the present invention.

FIG. 1A illustrates an exemplary embodiment of a device including various operational layers and modules for interaction with the device. The present embodiment comprises a platform 110, abstraction layers.

Some embodiments of the present invention may comprise additional operational layers such as open or proprietary application program interfaces (APIs) that allow software engineers, programmers and even users of a particular platform and/or device to author or install applications that are compatible with the particular platform's operating environment. An intelligent rendering engine may be embodied in such an application. Some embodiments of the present invention may lack certain operational layers or modules, such as synchronization module 130. Such modules would be absent should a particular device or platform not require, for example, synchronization operations.

The platform 110 is the underlying hardware and/or software for a particular operating environment. The platform 110 also defines a particular operating environment in which software, hardware and other applications are developed. An example of platform 110 is the Nokia Series 40 Developer Platform. The Nokia Series 40 Developer Platform can utilize platform technologies such as Java™ J2ME. Another example of platform 110 is the Nokia Series 60 and Series 80 Developer Platforms. The Nokia Series 60 and 80 platforms can utilize C++ in addition to Java™ J2ME technologies. The Palm OS® Platform, as another example of platform 110, supports native programming in C and C++ languages as well as Java programming via third-party Java Virtual Machines. The present invention further envisions the future development of operating environments on a variety of platforms.

Abstraction layer(s) 120 provide basic functionalities and means for accomplishing various operating goals that allow for, in part, the interoperation of the platform 110 with the client application 150 as well as other operational layers such as user interface 140. The abstraction layer(s) 120 provide classes, interfaces, abstract methods and other facilities and resources intended to support various functions and software operations regardless of any particular platform 110 or implementation on any particular device. Abstraction layer(s) 120 may be open or proprietary and are often composed of various information modules (e.g., FIG. 3).

Optional synchronization module 130 comprises the various operational instructions, functionalities and code necessary to allow a particular device or a program residing on such a device to communicate with an external data source, such as a desktop personal computer or enterprise server.

Communications allowing for a synchronization operation can be achieved in a variety of ways including a cable-to-handset synchronization mechanism whereby the device is physically coupled to a desktop personal computer to allow for the exchange and synchronization of data (e.g., electronic mail). Communications can also be achieved wirelessly whereby an enterprise server (e.g., a Microsoft Exchange Server) configured with appropriate software (e.g., SEVEN Server Edition from SEVEN Networks, Inc. of Redwood City, Calif.) coupled with access to a wireless gateway allows for access to electronic mail and other data by the device without any physical connection. Communications can also be achieved without intermediate server software or gateways (e.g., wirelessly).

Synchronization should be appreciated in the most general sense (e.g., as a communication event). For example, synchronization may comprise not only maintaining the consistency of data between two points (e.g., real time calendar data on a handheld device and a desktop computer) but also the duplication of data (e.g., received emails at a desktop forwarded to a handheld). Synchronization may also be utilized for the purpose of updating information (e.g., receiving updated software packages, patches and so forth)

While the optional synchronization module 130 may be necessary for synchronizing the client device and other external data source (e.g., a server), the presence of such a module is not meant to be interpreted as a prerequisite for the operation of a device-neutral user interface.

The user interface 140 comprises and/or is coupled to various modules and software components and source code to allow for the rendering and operation of a user interface on a variety of devices. The user interface 140 comprises or is otherwise coupled to libraries comprising elements and abstractions such as icons, cursors, scroll bars, sounds, animations, etc. and the necessary software and code to enable their use. In an embodiment of the present invention, the user interface 140 is neutral with regard to a particular device or operation environment. That is, a single interface can operate across a plurality of devices (e.g., Nokia, Kyocera and Treo) and/or environments (e.g., Nokia and PalmOS®) without the need to be reprogrammed for each of these particular devices and/or environment. That is, one user interface 140 fits a broad universe of devices and/or environments.

The client application 150 resides on any device coupled to a network (e.g., wirelessly) that allows for access to a server device or other computing entity, such as a second client device. Through the coupling of the device to, for example, a server, the user of the device may receive and transmit data such as electronic mail or access data stored at the server. It should further be appreciated that the present invention may also operate in a device that is not coupled or connected to any particular network or second device.

Small handheld devices are increasingly mobile. This mobility is often a direct result of integrating the handheld device with, for example, a cellular telephone although it is not necessary for the device and related client application 150 to be integrated with a cellular phone or any other particular device.

Mobile devices are often associated with a particular platform 110. For example, the aforementioned Nokia Series 40 Developer Platform is associated with the Nokia 6101 and 6102 model client devices as well as the Nokia 6020, 6235, 6235i and 6822 model client devices. The Nokia Series 60 Developer Platform, on the other hand, is associated with client devices such as the Nokia 6680, 6681, and 6682 model devices. Similarly, the Palm OS® Platform is associated with client devices such as Xplore™ G18, Kyocera 7135, and the Treo™ 650.

FIG. 1B illustrates various operational layers for user interaction and general operation within a particular device as may be found in the prior art. Such a prior art device may comprise the actual platform and various operational layers such as synchronization modules, APIs and so forth.

Prior art devices differ from a device utilized in the context of an embodiment of the present invention in that the client application, user interface and other applications are more integrated, interdependent and operationally incorporated (160) as compared to the present invention (170), which allows for increased flexibility and operability. The 'tightly wound' nature of the prior art is often the result of a general lack of portability of a user interface or any other software between various devices. That is, a particular application, including an interface, is written exclusively for a particular platform and exclusively for a particular device solely in conjunction with that platform. In order for a similar interface with similar functional offerings to operate on another device or platform, that interface must be re-authored in its entirety.

The exemplary device platform illustrated in FIG. 1A, on the other hand, evidences the ability to transport various functionalities from one platform or device to the next, especially with regard to the design of the abstraction layer 120 as is further discussed in the context of FIGS. 2A and 2B, below.

It should be noted that while FIG. 1A illustrates various operational layers as separate elements, this is not to suggest a necessary physical differentiation or a general lack of integration in an embodiment. Similarly, the integration of the client, user interface and abstraction layer (160) in FIG. 1B is not meant to suggest a literal, physical integration. These illustrations are provided merely to aid in the perception of the 'tightly wound' and vertically integrated aspects of the prior art versus an embodiment of the present invention, allowing for intelligent rendering of information in a limited display environment.

Figure 2B:
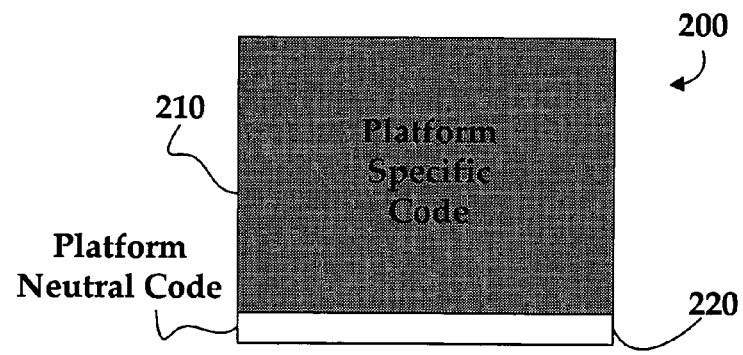
FIG. 2B illustrates a typical balance of platform-specific code and platform-neutral code as may generally be found in the prior art.

FIG. 2B illustrates a balance of platform specific code 210 and platform-neutral code 220 as may be found in the prior art.

For example, and as previously described in the context of FIG. 1B, prior art devices and their related platform and software are generally unitary in nature and are not meant to allow for portability of features, such as a user interface. As such, the prior art code 200 is monolithic in nature and comprised predominantly of platform-specific and application-specific code 210 (e.g., code written for, and only for, a Nokia 6680 device and configured with software written for the Series 60 Developer Platform environment).

This particularized code, while allowing for the integration and operation of a particular device on a particular platform, inhibits the portability of any particular features from one device to another (e.g., a user interface) as may otherwise be provided for with more generalized or device/platform-neutral code 220. Such device/platform-neutral code 220 may comprise code written in accordance with particular industry standards or specifications but that allows for the portability or interoperability of a specific and particular feature amongst devices. This neutral code 220 is minimally—if at all—present in prior art devices.

FIG. 2A illustrates an exemplary embodiment of an abstraction layer 250 and a blend of platform-specific code 260 and platform-neutral code 270 as may be found in a device-neutral user interface offering functionality for intelligent rendering of information in a limited display environment.

An abstraction layer 250, as may be found in an embodiment of the present invention and as illustrated in FIG. 2A, exhibits a much 'thinner' layer of platform- or device-specific code 260. In some embodiments of the present invention, platform specific code may be entirely non-existent. Abstraction layer 250, with its thin layer of platform- or device-specific code 260 may be, generally, the type of abstraction layer 120 as described in FIG. 1A.

As the abstraction layer 250 comprises more platform- or device-neutral code 270, the portability or interoperability of particular features—including a user interface offering intelligent rendering of information in a limited display environment—is increased in that a feature (e.g., an application or function) will operate on various platforms or devices due to its coding being dependent more on the generalized code 270 than with platform- or device-specific code 260 that limits or inhibits portability or interoperability.

Figure 3:
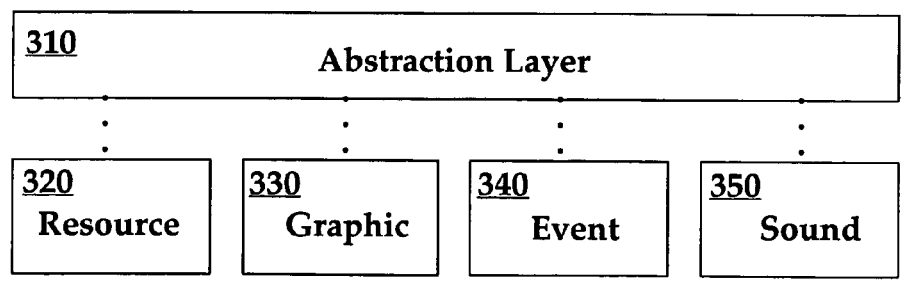
FIG. 3 illustrates an exemplary embodiment of an abstraction layer comprising various informational modules as described in the present invention.

FIG. 3 illustrates an exemplary embodiment of an abstraction layer 310 comprising various informational modules 320-350 as may be implemented in the abstraction layer 250 illustrated in FIG. 2A.

Informational modules 320-350 comprise routines and instructions as they pertain to various operational features of, for example, a particular platform 110 and/or client application 150 linked in the abstraction layer 310. These modules link the particular device to the particular platform.

For example, resource module 320 may comprise specific data or routines utilized in the operation of platform 110, client application 150 and/or device; for example: sleep mode, power on and off in addition to bitmaps, layouts and other libraries of information that are stored on the device or the means for accessing the same.

Graphics module 330 may comprise the information, instructions or knowledge with regard to utilizing specific files such as JPEGs, bitmaps or other graphic data that could be utilized by user interface 140 in its rendering of a user interface on a device. The graphics module 330 may retrieve these files from resource module 320.

Event module 340 may comprise a library of information, instructions or knowledge with regard to identifying actions or occurrences as may be detected by a particular program such as user actions (e.g., pressing a key) in addition to system occurrences (e.g., an internal calendar alarm) and how to translate them across various environments (e.g., as if they were executed in a native environment).

Sound module 350 may comprise the information, instructions or knowledge of how to play or emit various sounds (e.g., WAV files) to be generated in response to, for example, the occurrence of certain system events (e.g., system warnings concerning low battery power). Sound module 350 may retrieve that particular file from the resource module 320.

Abstraction layer 310, as it corresponds to abstraction layer 120 (FIG. 1A) and abstraction layer 250 (FIG. 2A) may comprise additional or fewer modules as is required by the particular platform 110 and/or device and/or client application 150. It should also be noted that while FIG. 3 illustrates various modules as separate elements, this is not to suggest the requirement of a physical differentiation or a general lack of integration in an embodiment of the present invention.

FIG. 4A illustrates the differences in screen display ratio for two prior art mobile devices, specifically a TREO™ 650 410 and a Nokia 6680 420. In the case of the TREO™ 650 mobile device 410, the screen display offers 320×320 pixel-width with 16-bit color; the display offers approximately 65,000 colors. In the case of the Nokia 6680 mobile device 420, the screen display offers 176×208 pixel-width with active matrix; the display offers approximately 262,144 colors.

Figure 4B:
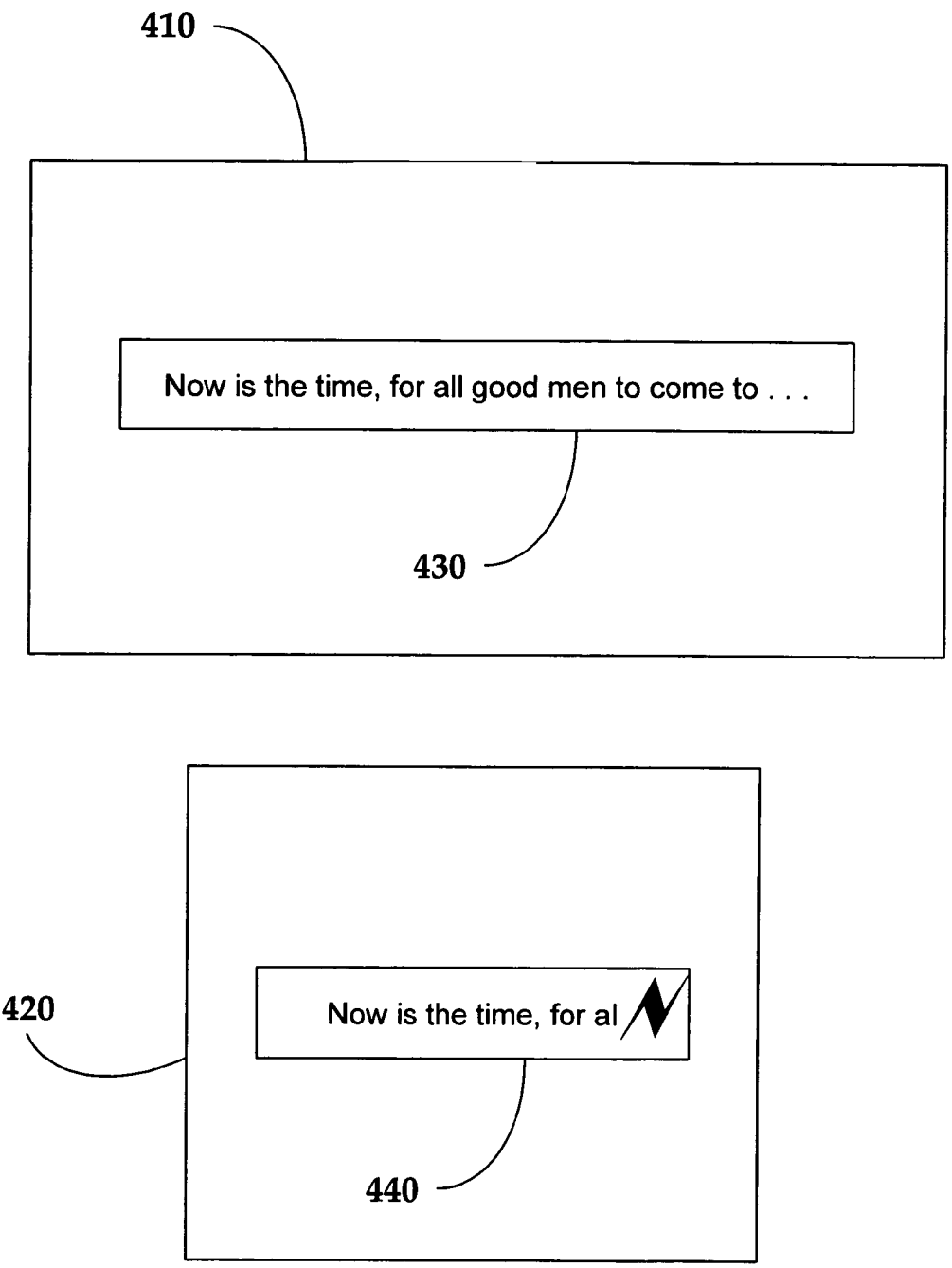
FIG. 4B illustrates the problems often associated with graphic elements rendered in mobile devices with different screen display ratios as found in the prior art.

FIG. 4B illustrates the problems often associated with graphic elements rendered in mobile devices with different display ratios as found in the prior art. For example, a graphic 430 (more specifically, in this case, a text string) may be approximately 300 pixels in width and renders without issue on device 410 with a 320 pixel-width. That same graphic (text string), in the context of device 420 with a 176 pixel-width, however, may be distorted 440 in that it is 'cut off' or 'wrapped around' due to the limited screen width. This distortion often results between different devices and/or platform despite the devices and/or platforms otherwise rendering the same graphic. This distortion can be especially problematic in the context of user interfaces offered by third-party software providers either for functionality and/or branding purposes in that certain functionality or brand identification is lost as a result of the distortion.

The device-neutral user interface and intelligent rendering functionality described in the present application aids in preventing distorted images (440) resulting from inevitable pixel variances and other differences between devices and/or platforms. The device-neutral user interface may not only specify a particular layout but also provide for adjustment of the interface environment depending on the particular nuances of any particular platform or device, for example, pixel-width as evidenced in FIGS. 4A and 413. These adjustments can be generally static relative the permanent limitations of a particular device (e.g., pixel-width) or 'as needed' or 'dynamic' per the particular demands of a particular application and/or the layout of given information at a given time.

Figure 5A:
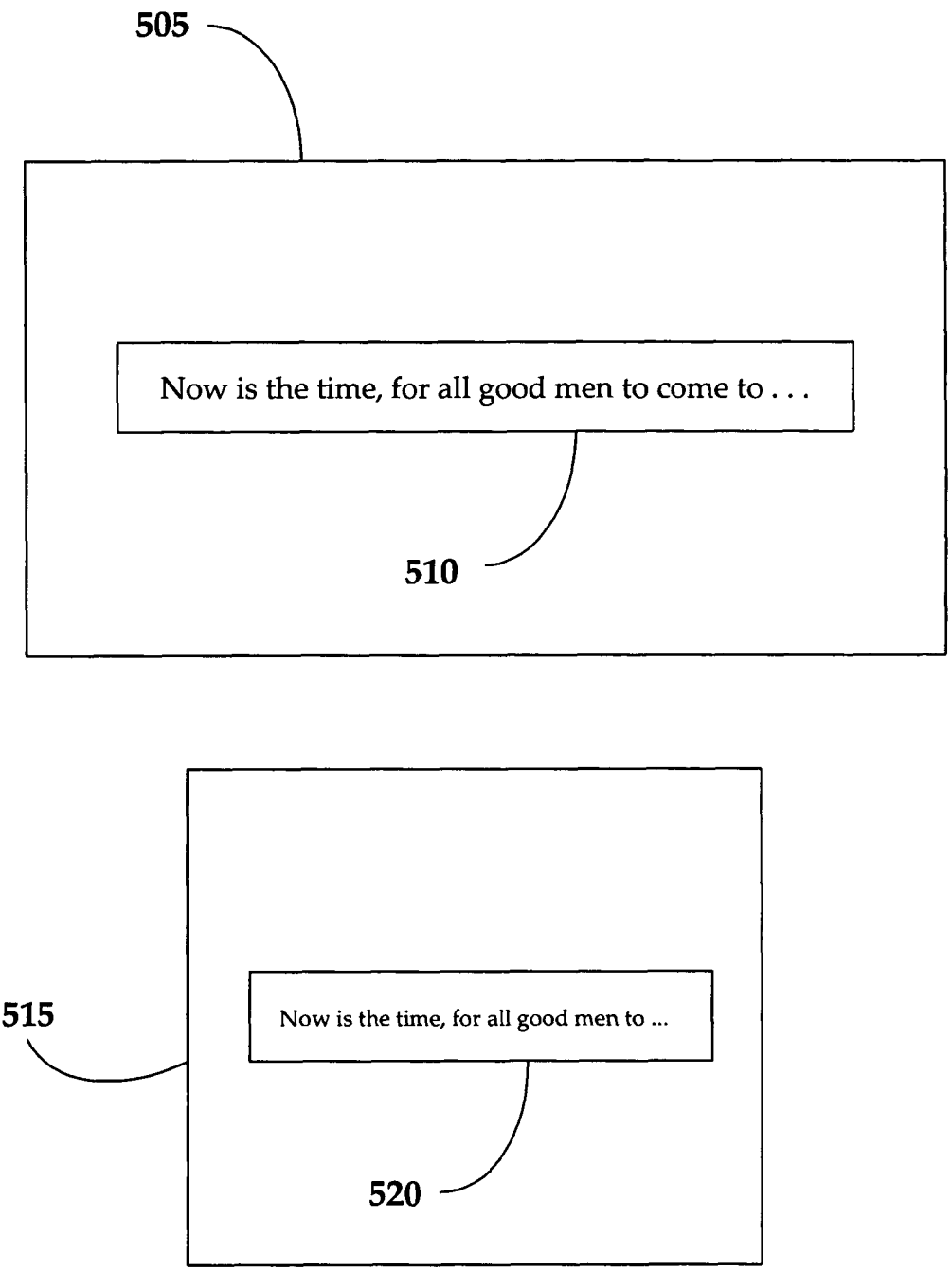
FIG. 5A illustrates an exemplary relative adjustment in a device-neutral user interface.

An example of relative adjustment in a device-neutral user interface is illustrated in FIG. 5A. A user interface environment 505 is similar in size to that exemplified in mobile device 410 in FIGS. 4A and 4B (320×320). Graphic 510 is rendered in user interface environment 505 in a size that is relative to the pixel limitations of the screen. Graphic 520 is similarly rendered in a user interface environment 515, which corresponds in display size to mobile device 420 in FIGS. 4A and 4B (208×176). But instead of graphic 520 appearing distorted as it did in FIG. 4B (440), the device-neutral interface has provided a substantially similar screen layout but made automatic adjustments for the graphic 520 to appear relative to the physical screen display constraints of the mobile device and its particular interface environment 515. This adjustment may be the result of considering various scaling ratios (e.g., 2:1, 4:1) whereby certain pixels or rendering elements are dropped or otherwise scaled in sized to allow for the relative adjustment of a graphical element or other rendered information.

Figure 5B:
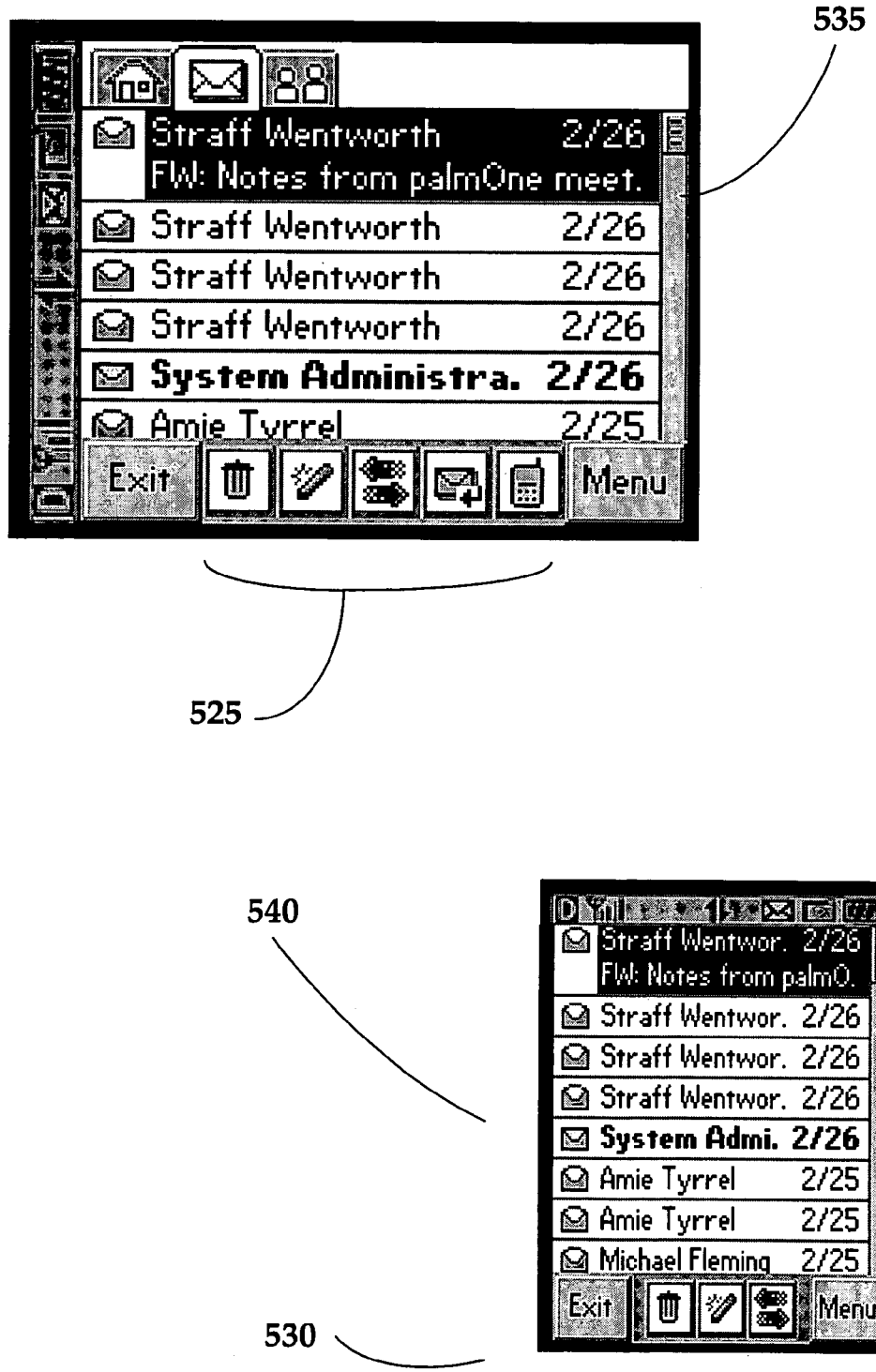
FIG. 5B illustrates an exemplary dynamic adjustment in a device-neutral user interface as it pertains to a global scaling feature.

FIG. 5B illustrates an exemplary dynamic adjustment in a user interface as it pertains to a global scaling feature. In some instances, a particular device will be unable to allow for relative adjustment of a user interface as is disclosed in FIG. 5A. This inability to offer relative adjustments might be a result of screen size limitations or the pure inability to render certain complex or high-definition graphics. In these instances, the device-neutral user interface can make intelligent decisions with regard to what information should be relatively adjusted, which information cannot be relatively adjusted (for varying reasons, for example, the critical importance of certain information) and certain information which should be dropped from the display altogether.

As shown in user interface environment 525, a display screen is shown with certain user interface information 535 such as a tool bar and various short-cut keys such as phone, home, contacts, trash, notes and electronic mail. In a mobile device comprising a user interface environment 530 with limited screen size, relative adjustments to all this information might make the short-cut key and tool bar entirely illegible due to excessive decreases in size and/or overcrowding on the display. In these instances, the device-neutral user interface of the present invention will make intelligent decisions with regard to what information must remain present and the limits on certain relative adjustments of information.

For example, in environment 530 (and as a result of a device-neutral user interface with intelligent rendering capabilities), user interface information 540 has been intelligently adjusted to address the limitations of the screen size. Specifically, certain short-cut keys (electronic mail, home, contacts and phone) have been entirely removed from the display. While these functionalities remain present in the device, their associated short-cut key has been removed from the display environment 530 and now requires access through a tree-menu or some other means as might be dependent on the particular menu structure of the user interface and/or device. Additionally, while other short-cut keys have been reduced in size, other keys remain more prominent. This intelligent rendering may be a result of default settings that identify certain features as being more mission critical than others or as a result of specific user settings. These indicators may comprise metadata reflecting relative importance of certain graphic information as a whole, in the context of particular applications, in the context of particular tasks and/or operations or as specifically designated by the user.

Figure 5C:
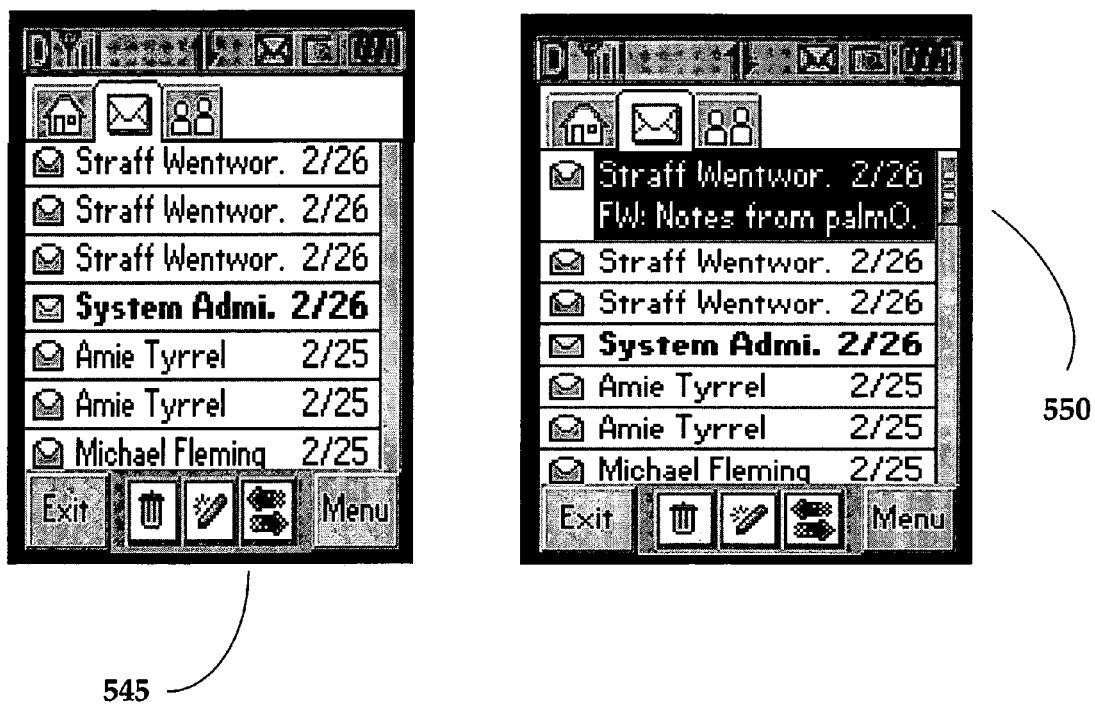
FIG. 5C illustrates an exemplary dynamic adjustment in a device-neutral user interface as it pertains to a zooming feature.

An example of exemplary dynamic adjustment in a user interface as it pertains to a zooming feature is illustrated in FIG. 5C. For example, a user interface environment 545 is shown listing several electronic mails of the user. In an effort to provide the user with as much information as possible, electronic mail information is presented in a small font size making it difficult for a user to sometimes comprehend the information presented in the interface environment 545. Utilizing an exemplary dynamic adjustment zooming feature, as a user scrolls up and down the list of electronic mails, a highlighted or selected electronic mail 550 is magnified or 'zoomed' whereby the font size is increased and all other electronic mails present in the environment 545 are either further reduced in size whereby all information remains on the screen but in reduced size or certain electronic mail listings are 'dropped' from the screen (e.g., instead of ten commonly sized electronic mail listings, zooming-in on any particular electronic mail message will result in one magnified message and seven messages at the original size with the other two messages 'dropped' from the screen).

Dynamic adjustment as a result of zooming may combine certain relative adjustment techniques as described in FIG. 5A in addition to certain intelligent rendering techniques as described in FIG. 5B. Certain embodiments may also allow for a user to specifically highlight particular graphics and/or elements of information in a user interface environment to cause the magnification of that particular graphics and/or element of information (e.g., by highlighting certain elements of information via five-way navigation or through point-and-tap as offered by a stylus and touch sensitive screen).

Figure 5D:
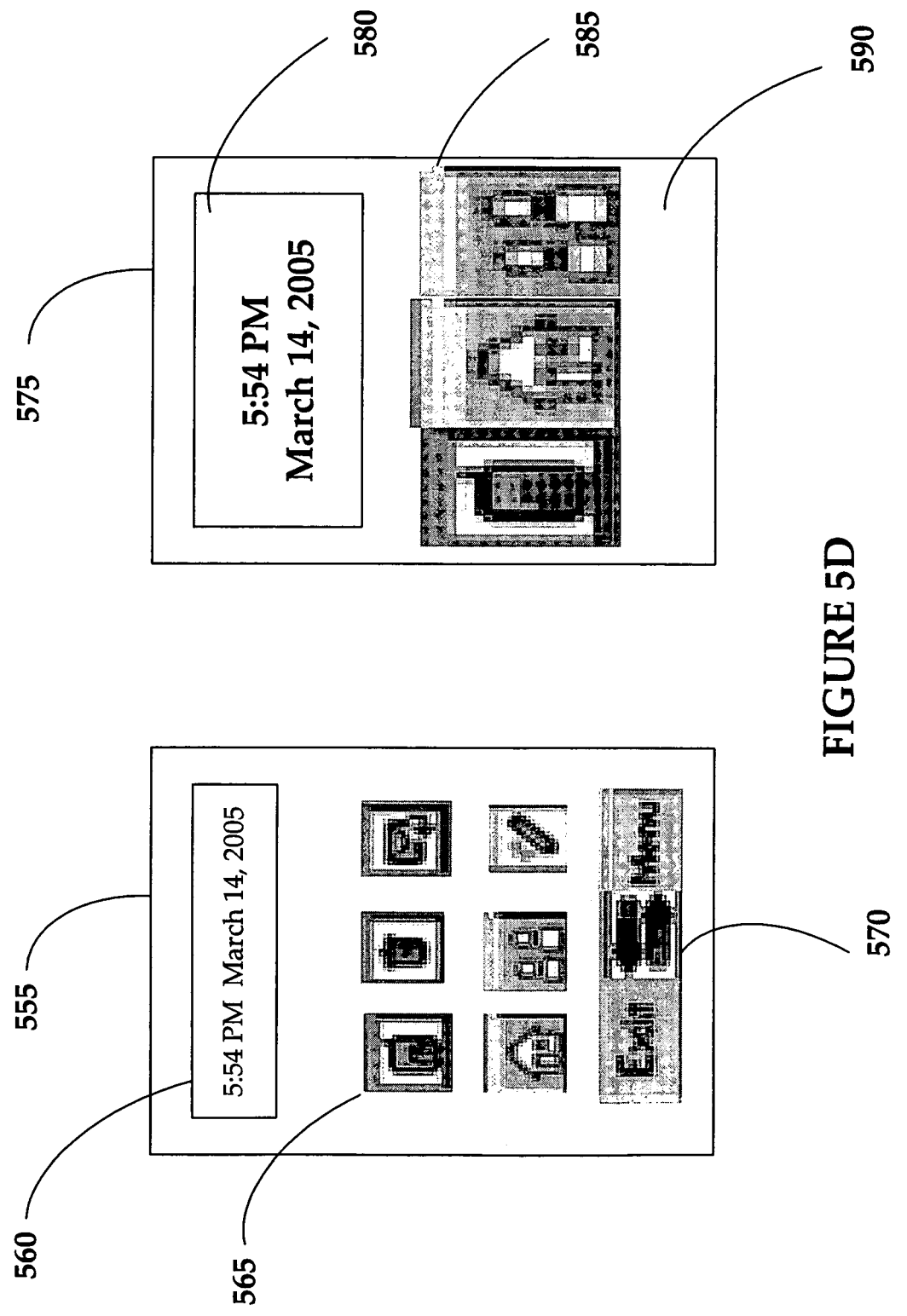

FIG. 5D illustrates exemplary dynamic adjustments in a user interface as those adjustments pertain to a 'quick-look' or 'short attention span' feature. For example, providing a user with all possible available information and in a small font-size may be appropriate when a user of device is able to offer their undivided attention to the device and focus attentively on that information as is shown in device 555. In interface environment 555, the user is presented with time and date information 560, various feature or short-cut keys 565 (e.g., phone, trash, electronic mail, home, contacts, notepad) and a tool bar 570.

In some instances, however, a user may be unable to direct their undivided attention to their device as they might be walking or driving a vehicle. In these instances, the user is forced to divide their attention; for example, ensuring the user does not accidentally walk into another person or veer off the road. The user, to the extent it is necessary for them to access their device with divided attention, often only need to take a 'quick-look' at information (e.g., directions to a destination, the date and time, or who is calling the user). In interface environment 575 illustrates a user interface whereby a 'quick look feature' is enabled and only essential information is displayed.

A 'quick look' feature or interface may be activated in a device by manually changing the display settings of the device through a menu, pressing a specific hard permanent-function key, pressing a soft hot-key assigned to enable 'quick look functionality' or through any other functionality that may allow activation of that particular function (e.g., a timer).

In display environment 575 with a quick-look interface enabled, the user is still presented with time and date information 580 but that information is enlarged in size and takes up twice as much space as the time and date information 560 in non-quick-look enabled environment 555. Additionally, the short cut keys 585 have been reduced in number to only those of utmost importance. In this case, those keys are phone, home and contacts and they are displayed at nearly three-times their normal size. Further, the tool bar 590 has been totally dropped from the screen as it is unlikely a user will be performing maintenance or adjusting settings on their device 575 while only able to offer a short amount of attention.

In a short-attention span or quick-look mode, the adjustment and selection of features to be displayed and, likewise, those features removed from the display can be set by default (e.g., factory settings) or they can be modified by the user as they reflect the user's needs. Furthermore, using a device-neutral user interface, the displayed information will adjust in size as is set forth by the default settings or the user in conjunction with certain limitation posed by the actual device (e.g., screen size). Certain methodologies as reflected in FIGS. 5A and 5B (relative adjustment and intelligent rendering) may be utilized in enabling quick-look functionality including the use of metadata to identify information desired in a quick-look as it might pertain to a particular application or a particular task.

Figure 6C:
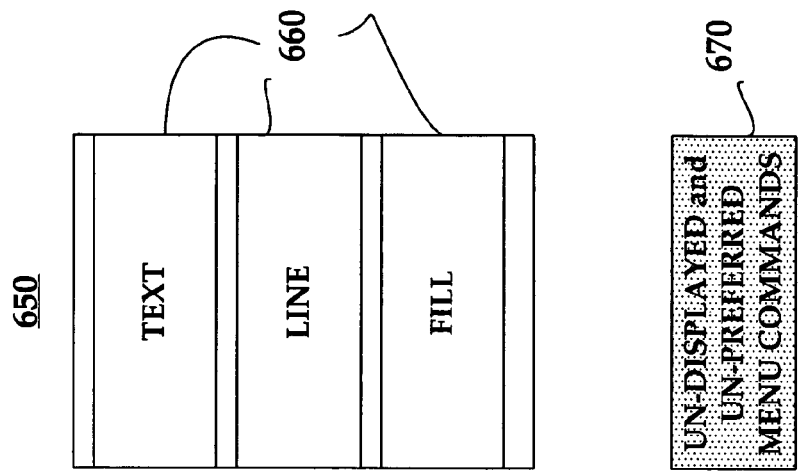
FIG. 6C illustrates a menu exhibiting intelligent prioritization of menu commands as governed by presently available and user preferred commands according to an exemplary embodiment of the present invention.
Figure 6B:
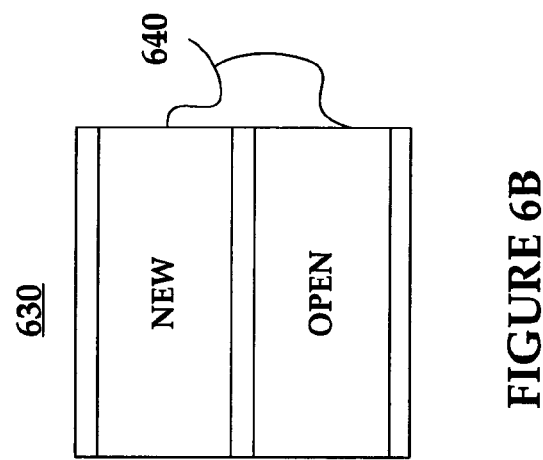
FIG. 6B illustrates a menu exhibiting intelligent prioritization of menu commands as governed by their present availability according to an exemplary embodiment of the present invention.
Figure 6A:
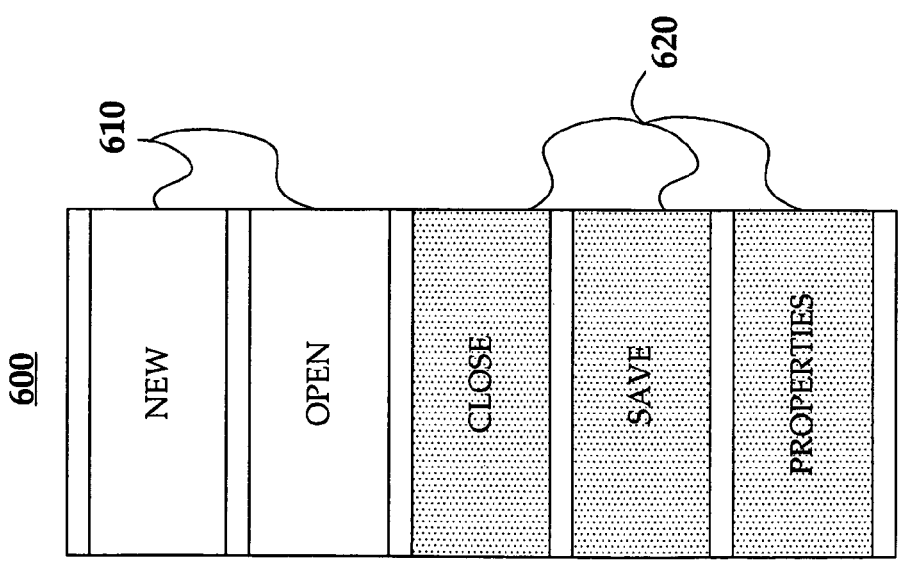
FIG. 6A illustrates a menu with 'available' and 'not-available' options as is known in the prior art.

FIG. 6A illustrates a menu 600 with available and not-available options as is known in the prior art. Menu 600 illustrates a number of available menu items 610 such as "New" and "Open." Menu 600 also displays a number of not available menu items 620 such as "Close," "Save" and "Properties."

Available menu items 610 are those menu items or commands that are presently available for execution, for example, opening a new file or opening an existing file. Not available menu items 620 are those menu items or commands that are not presently available for execution due to any number of factors. For example, an actual file or document may not be open. In such a case, a non-existent file cannot be closed or saved. Similarly, properties as to a non-existent file cannot be displayed. Should a file actually be opened, it is possible that certain not available menu items 620 may become available menu items 610 as that now open file or document can now be closed, saved or have its properties reviewed.

In the prior art, not available menu items 620 are usually displayed as 'grayed out.' That is, while available menu items 610 are displayed in a generally prominent text and can be selected either through, for example, highlighting with a mouse or keypad, a macro or other combination of key combinations (e.g., Ctrl+N in Microsoft® Word results in a new document opening), those items that are not available (i.e., not available menu items 620) are generally displayed in a less prominent text (e.g., a light gray color that still allows for readability but indicates its unavailability as menu command).

In applications with a large hierarchy of menu commands or menu commands with various levels (e.g., File-Open-Folder-File Name), selecting or executing an available menu command 610 often takes up a large amount of screen space due to a multi-level menu tree or various other menu screens, tabs and so forth. In a device with limited display space (e.g., a mobile device), such a complex menu-tree can obfuscate the entire display or, in some instances, may not be subject to display in any form due to the number of levels and/or menus and processing or other display limitations of any particular device.

Even in applications with generally straightforward menu displays, a large number of menu commands can cause the menu to overlap beyond the physical limitations of the screen thereby requiring the necessity of utilizing a scroll or elevator bar. While scroll or elevator bars can artificially provide additional space by scrolling available menu commands 610 up and down the screen, operating such a scroll bar in a limited display area is disadvantageous in that operating minute display tools, such as a scroll bar, with generally small operational controls on a mobile device is more difficult than on a desktop or even a laptop personal computer.

Further, the scroll bar will cause certain available menu commands 610 to disappear from the screen as available menu commands 610 are scrolled up and down by the user. To do so might cause a particular command of importance or interest to a user to disappear as they view other available menu commands 610. Part of this difficulty is a result of the integration of all menu commands on the menu, that is, both available menu commands 610 and not available menu commands 620. For example, a particular menu might comprise ten various commands. Despite the fact that only two of those commands might be available menu commands 610 as a result of the current state of the device or an application, the remaining eight not available menu commands 620 will still be displayed thereby utilizing large amounts of screen display space.

FIG. 6B illustrates a menu 630 exhibiting intelligent prioritization of menu commands as governed by their present availability according to an embodiment of the present invention. In FIG. 6B, the state of the device or application is the same as that of the prior art menu as illustrated in FIG. 6A. In FIG. 6B, however, only available menu commands 640 are displayed. This results in savings of space, memory and processing power as, for example, only two menu commands—New and Open—are displayed (available menu commands 640). In such an embodiment of a menu 630, it would not be necessary to utilize a scroll bar to access various menu commands as the menu 630 is reduced in size due to the non-display of not available menu commands 620.

Should the state of the device or application change, however, those commands that are presently not displayed but otherwise relevant to the change in device state would then be added to the list of available menu commands 640 and displayed on the menu 630.

Certain rendering methodologies (e.g., relative adjustment, dynamic adjustment, zooming and quick-look as described in FIGS. 5A-D, respectively) may further be utilized wherein additional display space in a user interface environment is preserved through further reducing the amount of space occupied by menu 630.

FIG. 6C illustrates a menu 650 exhibiting intelligent prioritization of menu commands as governed by user preference according to an embodiment of the present invention. In FIG. 6C, the state of the device is such that a menu would normally, for example, display ten menu commands if it were a type of a menu as found in the prior art of FIG. 6A. In FIG. 6C, however, only preferred available menu commands 660 are displayed; preferred available menu commands 660 in this particular embodiment are not just those commands capable of execution but those commands capable of execution and whose display presence is preferred by the user of the mobile device relative, for example, a particular application or operational context.

For example, in menu 650 the display of ten available menu commands 660 would still occupy a large amount of space on most mobile devices despite the fact that, for example, five additional commands are not displayed as a result of them being not available. In this particular embodiment, the mobile device will recognize that of the ten available menu commands, the user of the mobile device only utilizes three of those menu commands on any regular basis. The mobile device will then display only those three menu commands as preferred available menu commands 660. Those commands that are not preferred but are otherwise available will not be displayed 670.

This results in a better end user experience through savings of space, memory and processing power in addition to smoother and more navigable interfaces as only those available menu commands actually needed by the user are displayed. In such an embodiment of a menu, it would not be necessary to utilize a scroll bar to access various menu commands as the menu 650 is reduced in size due to the non-display of not available menu commands as well as available menu commands that are not preferred by the user.

As in the case of FIG. 6B, various rendering methodologies (e.g., relative adjustment, dynamic adjustment, zooming and quick-look as described in FIGS. 5A-D, respectively) may further be utilized wherein additional display space in a user interface environment is preserved through further reducing the amount of space occupied by menu 650.

Preferred available menu commands 660 can be those commands as recognized by the device as being preferred (e.g., in 50 previous uses of a particular menu, only two commands out of ten were utilized) or can be identified manually by the user. Preferred available menu commands 660 can also be set by default by the manufacturer of a device or platform. For example, it may be recognized in the industry that while particular menu commands might be useful, they are only utilized by a small percentage of the public owning the device (e.g., computer programmers). As such, only those commands used by the general public are displayed when available.

Should the state of the device or application change, however, those commands that are presently not displayed but preferred would then be added to the list of preferred available menu commands 660 and displayed on the menu 650 with regard to the state change invoking the availability of certain commands.

Figure 7A:
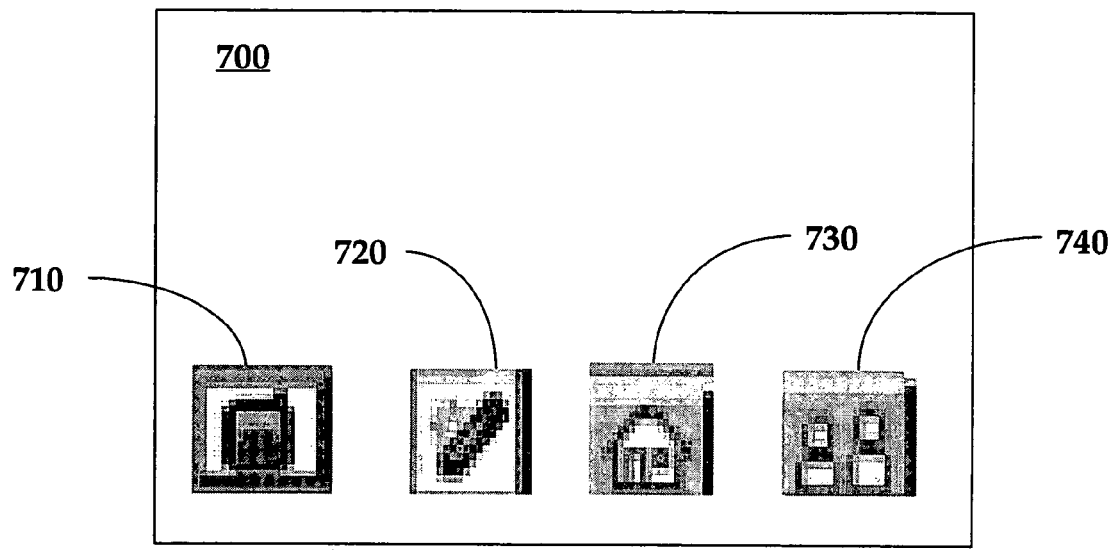
FIG. 7A illustrates icons on a user interface with no particular limitations as to their rendering and as is known in the prior art.

The same intelligence utilized in a menu can also be utilized with regard to display icons. FIG. 7A illustrates a display environment 700 wherein limitations as to screen size, pixels or other factors do not affect the display of a series of icons 710-740 as is generally the case in prior art devices and interfaces. That is, display of the icons 710-740 will occur regardless of screen size. The display of these icons 710-740, however, may be accompanied by distortion, wrap around, cut offs or other unintended and adverse manipulation of the rendered icons 710-740. These icons 710-740 may be for such functions as telephone, notepad, home and contacts.

Figure 7B:
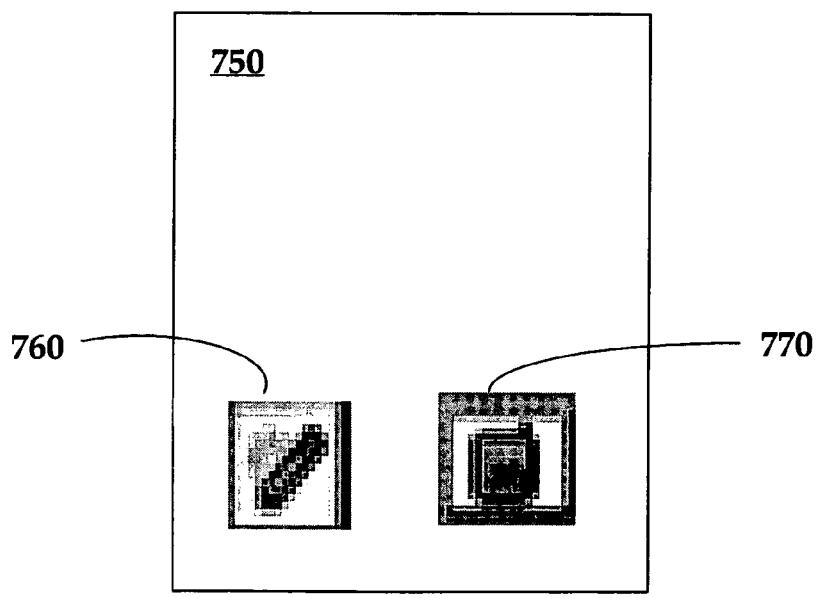
FIG. 7B illustrates icons on a user interface with display limitations wherein the icons are intelligently selected in an exemplary embodiment of the present invention.

FIG. 7B illustrates a display environment 750 wherein certain limitations, screen-width for example, make it impossible for the display of four icons of a given size, or at least the display of those four icons whereby they may be identified or otherwise retain their graphic communications value. In this example, the device interface 750 may display only those icons that are preferred by the user 760-770 such as notepad and telephone. Like the menu displayed in FIG. 6C, these preferred icons 760-770 may be the result of default preferences, user-input preferences or intelligent decision making by logic in a device. This logic may be similar to the logic used in a layout engine as described in U.S. provisional patent application No. 60/661,757. Certain rendering techniques as referenced in FIGS. 5A-5D may also be utilized.

Figure 8B:
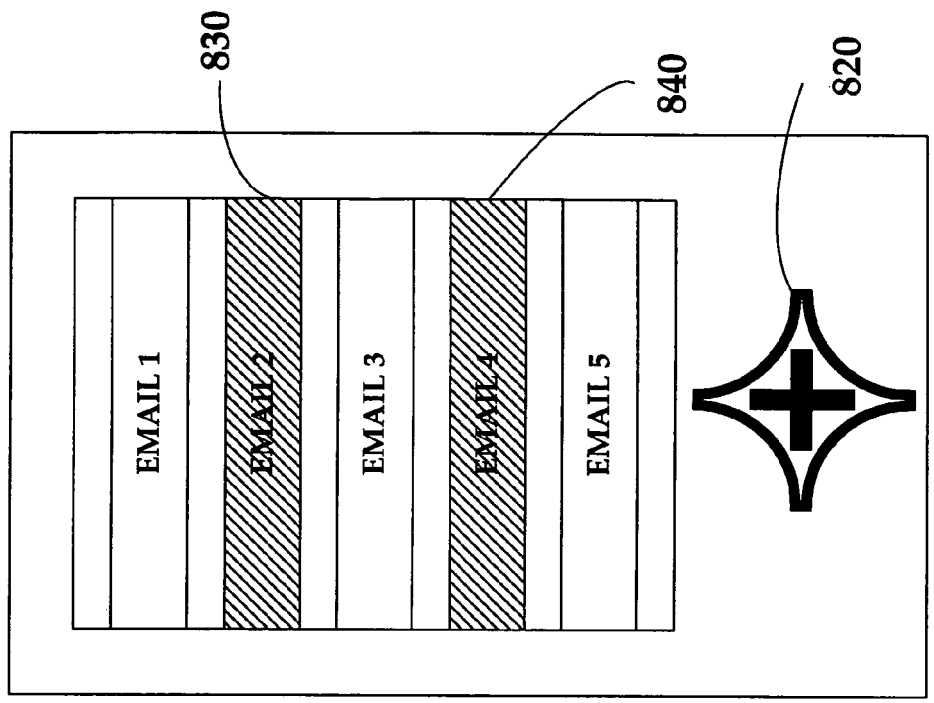
FIG. 8B illustrates the exemplary management of information displayed in FIG. 8A using five-way navigation in an embodiment of the present invention.
Figure 8A:
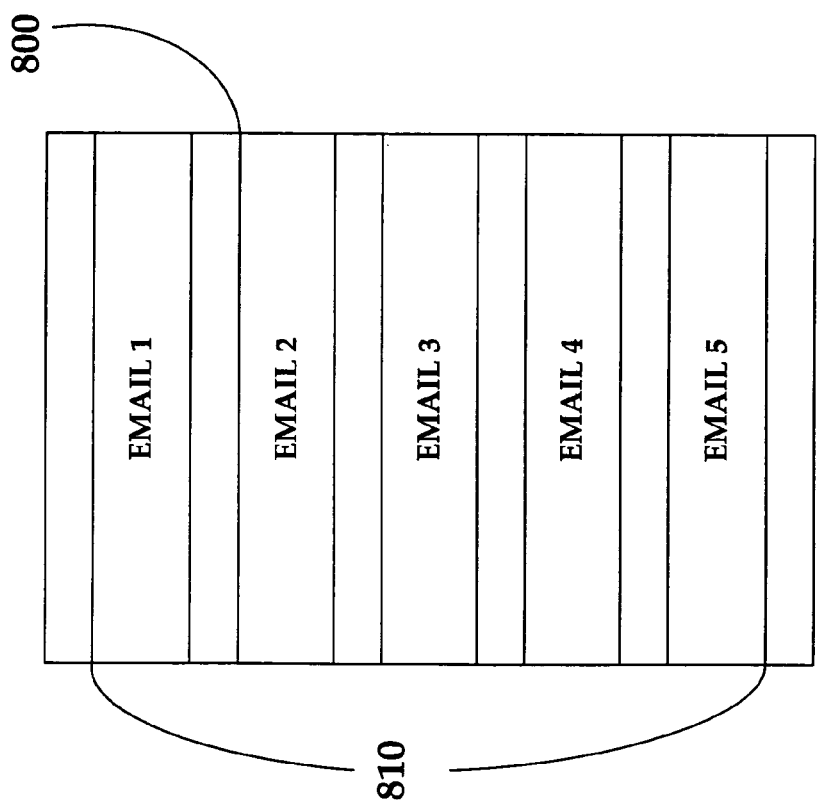
FIG. 8A illustrates the display of information on a mobile device as may be found in the prior art.

FIG. 8A illustrates the management of information in a prior art display environment 800 using, for example, five-way navigation. Shown on the display 800 are a series of electronic mail messages 810 as may be displayed in a mailbox feature on, for example, a mobile device.

In order to manage electronic mail messages, for example, it is necessary to move a highlight bar to a particular message, open the message (e.g., a center press on the navigation control), enter a delete command either manually, through a drop-down menu or through icon selection, and finally confirm deletion of a message before the message is finally removed from a mobile device's mailbox. The use of a thumb-scroll wheel, 'direction buttons' or a stylus may also be used. In systems where a mobile device is synchronized with a desktop mailbox (e.g., Microsoft® Outlook), an additional confirmation is often required as to whether the user wishes to delete the message only on the mobile device, only on the desktop or on both the handheld and the desktop. The process is then repeated for each message to be deleted. For a user that receives a large number of electronic mail messages on their mobile device, this can be extremely tedious and time consuming in addition to wasting battery and processing resources.

FIG. 8B illustrates the use of a five-way navigation control 820 to manage information such as electronic mail using various graphic rendering and control techniques as have been described throughout the disclosure of the present invention. Using the five-way navigation control 820, a user may move an icon, cursor or other indicator on a display up, down, left and right in addition to a confirmation or 'down click' feature wherein the user presses down on the center of the navigation tool in an action sometimes equivalent to the pressing of the carriage return key on a keyboard. Five-way navigation allows a user to operate various functionalities of a mobile device with one hand and without the use of, for example, a stylus. When combined with intelligent rendering through relative scaling and/or intelligent prioritization, the review, selection and ultimate disposal of certain messages is made easier.

In FIG. 8B, as in FIG. 8A, a list of five electronic mails is presented. Should the user wish to delete two of those electronic mails (e.g., 830 and 840), using traditional management methods would require the user to highlight the first message (830), open the message, enter a delete command either manually, through a drop-down menu or through icon selection and then confirm deletion of the message. Using an exemplary five-way navigation technique in conjunction with the various graphic rendering techniques disclosed herein, the user can navigate down the message to be deleted (830) by pressing down on the navigation tool 820 and then pressing the navigation tool 820 to the right and then down clicking whereby the message is then highlighted and selected for further action, in this instance, deletion.

The user can then press the navigation tool 820 down two more times to arrive at a second message to be deleted (840). The user can then highlight the message for deletion as in the instance of message 820. The user can then, at an appropriate time, select a 'delete all' command wherein all highlighted messages are then deleted. Using five-way navigation is not limited to deletion of messages. A user could also select files to review (e.g., where the user has access to desktop files) or could also manage files or messages to be placed in particular mobile device folders for organization using similar navigation and highlighting techniques. Similarly, a user could select various contacts in a directory to electronically 'beam' (e.g., through a Bluetooth® or infrared transmission) to another user.

The above-described embodiments are exemplary. One skilled in the art will recognize and appreciate various applications of the disclosed invention beyond those presently described here. This disclosure is not meant to be limiting beyond those limitations as expressly provided in the claims.

What is claimed is:

1. A method for displaying textual and graphical components in a limited user interface display environment, the method comprising:

selecting a set of textual and graphical components for possible rendering in the limited user interface display environment, wherein the set of textual and graphical components will be rendered incorrectly as a result of a limitation of the limited user interface display environment, and wherein the set of textual and graphical components are part of a user interface that allows a user to control a progression of an application through a predefined set of states;

identifying the limitation of the limited user interface display environment that will result in the incorrect rendering of the set of textual and graphical components;

based on the identified limitation of the user interface display environment, determining, without user interaction, a component from the set of textual and graphical elements that is not affected by the limitation of the limited user interface display environment the determination based on a predetermined characteristic associated with the component, wherein the predetermined characteristic includes metadata associated with the component;

rendering the determined component from the set of textual and graphical components in the limited user interface display environment, wherein the determined component from the set of textual and graphical components is rendered correctly notwithstanding the limitation of the limited user interface display environment; and adjusting the size of a second component from the set of textual and graphical components in the limited user interface display environment in order to compensate for the limitation of the limited user interface display environment, wherein adjusting the size of the second component further comprises applying a scaling factor to the second component, the adjusting occurring without user interaction.

2. The method of claim 1, wherein the determined component from the set of textual and graphical components rendered correctly notwithstanding the limitation of the limited user interface display environment includes time information.

3. The method of claim 1, wherein the determined component from the set of textual and graphical components rendered correctly notwithstanding the limitation of the limited user interface display environment includes date information.

4. The method of claim 1, wherein the determined component from the set of textual and graphical components rendered correctly notwithstanding the limitation of the limited user interface display environment includes short-cut keys.

5. The method of claim 1, wherein the determined component from the set of textual and graphical components rendered correctly notwithstanding the limitation of the limited user interface display environment includes a tool bar.

6. The method of claim 1, further comprising eliminating a component other than the determined or the second component from the set of textual and graphical components from the limited user interface display environment in order to compensate for the limitation of the limited user interface display environment, wherein eliminating the component occurs without user interaction.

7. The method of claim 1, wherein the determination of the component from the set of textual and graphical components occurs in accordance with a default setting.

8. The method of claim 1, wherein the determination of the component from the set of textual and graphical components occurs in accordance with a previously determined user setting.

* * * * *